(12) United States Patent
Zhan

(10) Patent No.: US 12,320,524 B1
(45) Date of Patent: Jun. 3, 2025

(54) KITCHEN APPLIANCE AND BASE THEREOF

(71) Applicant: Qiuping Zhan, Shenzhen (CN)

(72) Inventor: Qiuping Zhan, Shenzhen (CN)

(73) Assignee: Qiuping Zhan, Shenzhen (CN)

( * ) Notice: Subject to any disclaimer, the term of this patent is extended or adjusted under 35 U.S.C. 154(b) by 0 days.

(21) Appl. No.: 18/752,208

(22) Filed: Jun. 24, 2024

(30) Foreign Application Priority Data

Jun. 12, 2024 (CN) .......................... 202421323330.X

(51) Int. Cl.
| | | |
|---|---|---|
| *F16H 57/038* | (2012.01) | |
| *A47J 43/06* | (2006.01) | |
| *A47J 43/08* | (2006.01) | |
| *F16H 1/16* | (2006.01) | |
| *F24C 15/08* | (2006.01) | |

(52) U.S. Cl.
CPC .............. *F24C 15/086* (2013.01); *A47J 43/06* (2013.01); *A47J 43/08* (2013.01); *F16H 1/16* (2013.01); *F16H 57/038* (2013.01)

(58) Field of Classification Search
CPC ......... A47J 43/06; A47J 43/08; F16H 57/037; F16H 57/038; F16H 57/039
See application file for complete search history.

(56) References Cited

U.S. PATENT DOCUMENTS

| | | | | |
|---|---|---|---|---|
| 9,167,938 | B2 * | 10/2015 | Benoit | ................. A47J 43/044 |
| 9,675,101 | B2 * | 6/2017 | Conti | ..................... A23N 1/02 |
| 10,925,440 | B2 * | 2/2021 | Chung | ................ A47J 43/044 |
| 11,918,009 | B2 * | 3/2024 | Vulava | .................... A23G 9/12 |
| 2024/0068555 | A1 * | 2/2024 | Naik | .................. F16H 57/0471 |

FOREIGN PATENT DOCUMENTS

| | | | | |
|---|---|---|---|---|
| CN | 201205230 | Y * | 3/2009 | ............ A47J 43/087 |
| KR | 101760033 | B1 * | 7/2017 | |

\* cited by examiner

*Primary Examiner* — Bobby Rushing, Jr.
(74) *Attorney, Agent, or Firm* — Rhodes IP PLC; Christopher R Rhodes

(57) ABSTRACT

This disclosure relates to the field of electrical appliance, in particular to a kitchen appliance and a base thereof. The base includes a base body, an input shaft assembly arranged in the base body and connected to an external actuator, and an output shaft assembly arranged in the base body and removably connected to a household appliance body, wherein the input shaft assembly is in transmission connection with the output shaft assembly, the input shaft assembly is arranged in a first direction, and the output shaft assembly is arranged in a second direction, an included angle between the first direction and the second direction ranges from 85° to 95°.

9 Claims, 6 Drawing Sheets

KITCHEN APPLIANCE AND BASE THEREOF

TECHNICAL FIELD

The disclosure relates to the field of electrical appliance, in particular to a kitchen appliance and a base thereof.

BACKGROUND

Kitchen appliances, such as rice cookers, induction cookers, air fryers and other kitchen appliances, are necessary cooking appliances in daily life. Using kitchen appliances can improve the efficiency of cooking, which allows a user to complete the cooking task in a shorter period of time, and provides a lot of convenience for busy modern people.

Kitchen mixers, such as blenders, juicers, slicers, meat grinders and wall-breaking blenders, are often used in the preparation of ingredients and can greatly simplify the process of food preparation by automating the mixing process, allowing for quick blending of ingredients, easy preparation of fresh juices and quick cutting of various ingredients.

Currently, the kitchen mixing device consists of two main parts, a base and a mixing cup, wherein the base is provided with a power source module inside, such as a motor assembly, a power output end of the power source module extends through the base and is inserted into a bottom of the mixing cup to connect to a stirring module in the mixing cup, the stirring module is used for stirring ingredients by the power source module. The power source module is arranged inside the base, so that the power source module can only drive a kitchen mixing device corresponding to the base where it is positioned. In this scenario, where each mixing device corresponds to a separate base, it not only leads to high costs, but also a significant amount of space due to multiple mixing devices and the bases.

SUMMARY

The purpose of the present disclosure is to provide a kitchen appliance and a base thereof, which solves technical problems of high costs and a significant amount of space resulting from the fixed combination of mixing devices and the bases in traditional kitchen appliance.

This disclosure provides a base for a kitchen appliance including a base body, an input shaft assembly arranged in the base body and configured to connect to an external actuator, the base further includes an output shaft assembly arranged in the base body and configured to removably connect to a household appliance body, wherein the input shaft assembly is in transmission connection with the output shaft assembly, the input shaft assembly is arranged in a first direction, and the output shaft assembly is arranged in a second direction, an included angle between the first direction and the second direction ranges from 85° to 95°.

In some embodiments, the included angle between the first direction and the second direction is 90°.

In some embodiments, the input shaft assembly includes a horizontally disposed input shaft and a first gear disposed at one end of the input shaft, and the output shaft assembly includes a vertically disposed output shaft and a second gear disposed at one end of the output shaft, the first gear is meshed with the second gear; alternatively, the input shaft assembly includes a horizontally disposed worm, and the output shaft assembly includes a vertically disposed output shaft and a worm wheel disposed on the output shaft, the worm is meshed with the worm wheel.

In some embodiments, the input shaft assembly includes a horizontally disposed input shaft and a first gear disposed at one end of the input shaft, and the output shaft assembly includes an output shaft vertically disposed and detachably connected to the household appliance body, an output transmission shaft arranged parallel to the output shaft, at least one gear transmission group disposed between the output shaft and the output transmission shaft, and a second gear disposed at one end of the output transmission shaft, wherein the first gear is meshed with the second gear. Alternatively, the input shaft assembly includes an input shaft horizontally disposed and connected to the external actuator, an input transmission shaft arranged parallel to the input shaft, at least one gear transmission group disposed between the input shaft and the input transmission shaft, and a first gear disposed at one end of the input transmission shaft; and the output shaft assembly includes a vertically disposed output shaft and a second gear disposed at one end of the output shaft, wherein the first gear is meshed with the second gear.

In some embodiments, the input shaft assembly includes an input shaft horizontally disposed and connected to the external actuator, an input transmission shaft arranged parallel to the input shaft, at least one gear transmission group disposed between the input shaft and the input transmission shaft, and a first gear disposed at one end of the input transmission shaft; and the output shaft assembly includes an output shaft disposed vertically and detachably connected to the household appliance body, an output transmission shaft arranged parallel to the output shaft, at least one gear transmission group disposed between the output shaft and the output transmission shaft, and a second gear disposed at one end of the output transmission shaft, the first gear is meshed with the second gear.

In some embodiments, the input shaft assembly includes an input shaft horizontally disposed and connected to the external actuator, an input transmission shaft arranged parallel to the input shaft, at least one gear transmission group disposed between the input shaft and the input transmission shaft, and a first gear disposed at one end of the input transmission shaft; and the output shaft assembly includes a vertically disposed output shaft and a second gear disposed at one end of the output shaft, the first gear is meshed with the second gear.

In some embodiments, a ratio of the output rotational speed of the output shaft assembly to the input rotational speed of the input shaft assembly ranges from 1:1.1 to 1:10; alternatively, a ratio of the output rotational speed of the output shaft assembly to the input rotational speed of the input shaft assembly ranges from 5:1 to 50:1.

In some embodiments, the base further includes a holder disposed within the base body, wherein the holder has a top surface, a bottom surface, and a side surface connected to the top surface and the bottom surface; a bottom end of the output shaft assembly is connected to the bottom surface by a first bearing unit, a top end of the output shaft assembly is rotatably connected to the top surface by a second bearing unit, and the input shaft assembly is rotatably connected to the side surface by a third bearing unit, and extends out of a sidewall of the base.

In some embodiments, a horizontally extending fixing seat is provided outside the side surface of the holder, and an opening is provided on the side surface of the base and allows the fixing seat to pass through, a locking sleeve is connected to the fixing seat and arranged outside the opening, and an end of the input shaft assembly connected to the external actuator extends through the fixing seat and the locking sleeve in sequence and extends out of the locking sleeve.

This disclosure also provides a kitchen appliance including a base, an actuator and at least one appliance body, wherein the base is configured as the base described above, the actuator is connected to the input shaft assembly arranged on the base, and the at least one appliance body is detachably connected to the output shaft assembly arranged on the base, the appliance body is at least one of a juicing cup, a stirring cup, a slicing cup, or a wall-breaking cup.

The disclosure, after adopting the above technical solution, has the following beneficial effect.

In this disclosure, an output shaft assembly and an input shaft assembly, both arranged in different directions, are provided in the base, and the output shaft assembly is externally connected to an external actuator, and the output shaft assembly is connected to an external appliance body, so that the external actuator can drive different appliance bodies by changing the direction of an input torque, and different appliance bodies can share the same external actuator and the same base, which greatly reduces the costs, and it also reduces the occupied area in the kitchen.

BRIEF DESCRIPTION OF THE DRAWINGS

In order to more clearly illustrate the technical solutions in the embodiments of the disclosure or prior art, the following will briefly introduce the accompanying drawings that need to be used in the description of the embodiments, and it is obvious that the accompanying drawings in the following description are only some of the embodiments of the disclosure, and for the person of ordinary skill in the field, under the premise of not exerting creative labor, it is possible to obtain other drawings according to the accompanying drawings. the accompanying drawings.

REFERENCE LIST

10—base; 11—base body; 12—opening; 13—locking sleeve;
20—input shaft assembly; 21—input shaft; 22—first gear; 23—adapter shaft; 24—worm; 25—input transmission shaft;
30—output shaft assembly; 31—output shaft; 32—second gear; 33—worm wheel; 34—output transmission shaft; 35—gear transmission group;
40—holder; 41—top surface; 42—bottom surface; 43—side surface; 431—fixing seat; 44—first bearing unit; 45—second bearing unit; 46—third bearing unit; 47—accommodating space;
50—actuator;
60—appliance body.

DETAILED DESCRIPTION

Unless otherwise defined, all technical and scientific terms used in this document have the same meanings as commonly understood by technicians in the technical field to which this disclosure belongs. The terms used in the specification of this application are for the purpose of describing specific embodiments only and are not intended to limit the disclosure. The terms "include" and "have" and any variations thereof in the specification, claims, and accompanying drawings of this disclosure are intended to cover non-exclusive inclusion. The terms "first", "second", etc., used in the specification, claims, or accompanying drawings of this disclosure are used to distinguish different objects and are not used to describe a specific order.

The mention of "embodiments" in this document implies that the specific features, structures, or characteristics described in conjunction with the embodiments may be included in at least one embodiment of this disclosure. The appearance of this phrase in various locations in the specification does not necessarily refer to the same embodiment, nor are they mutually exclusive, independent, or alternative embodiments. It is explicitly and implicitly understood by those skilled in the art that the embodiments described herein can be combined with other embodiments.

In order to enable those skilled in the technical field to better understand the solution of this disclosure, the technical solutions in the embodiments of this disclosure will be described clearly and completely below in conjunction with the accompanying drawings.

Figure 1:
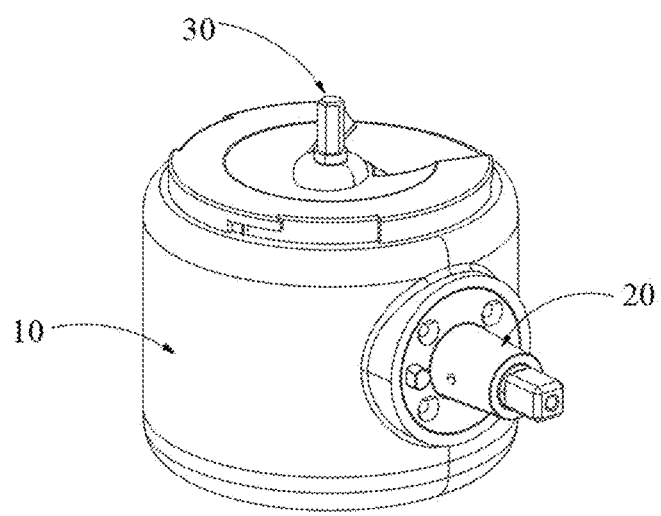
FIG. 1 is a schematic diagram of a base for a kitchen appliance according to an embodiment of the present disclosure.

Referring to FIG. 1, a base 10 of a kitchen appliance according to an embodiment of the present disclosure includes a base body 11, an input shaft assembly 20 arranged in the base body 11 and configured to connect to an external actuator (not shown), and an output shaft assembly 30 arranged in the base body 11 and configured to removably connect to an appliance body (not shown). The input shaft assembly 20 is in transmission connection with the output shaft assembly 30. The input shaft assembly 20 is arranged in a first direction, and the output shaft assembly 30 is arranged in a second direction, an included angle between the first direction and the second direction ranges from 85° to 95°. In this embodiment, the included angle between the first direction and the second direction is preferably 90°.

In this embodiment, the output shaft assembly 30 and the input shaft assembly 20, both arranged in different directions, are provided in the base 10. The input shaft assembly 20 is connected to an external actuator, and the output shaft assembly 30 is connected to an external appliance body. In this way, the external actuator is capable of driving different external appliance bodies by changing the direction of an input torque. The different external appliance bodies may share the same external actuator and base 10, which greatly reduces costs and reduces the occupied area in the kitchen.

Figure 2:
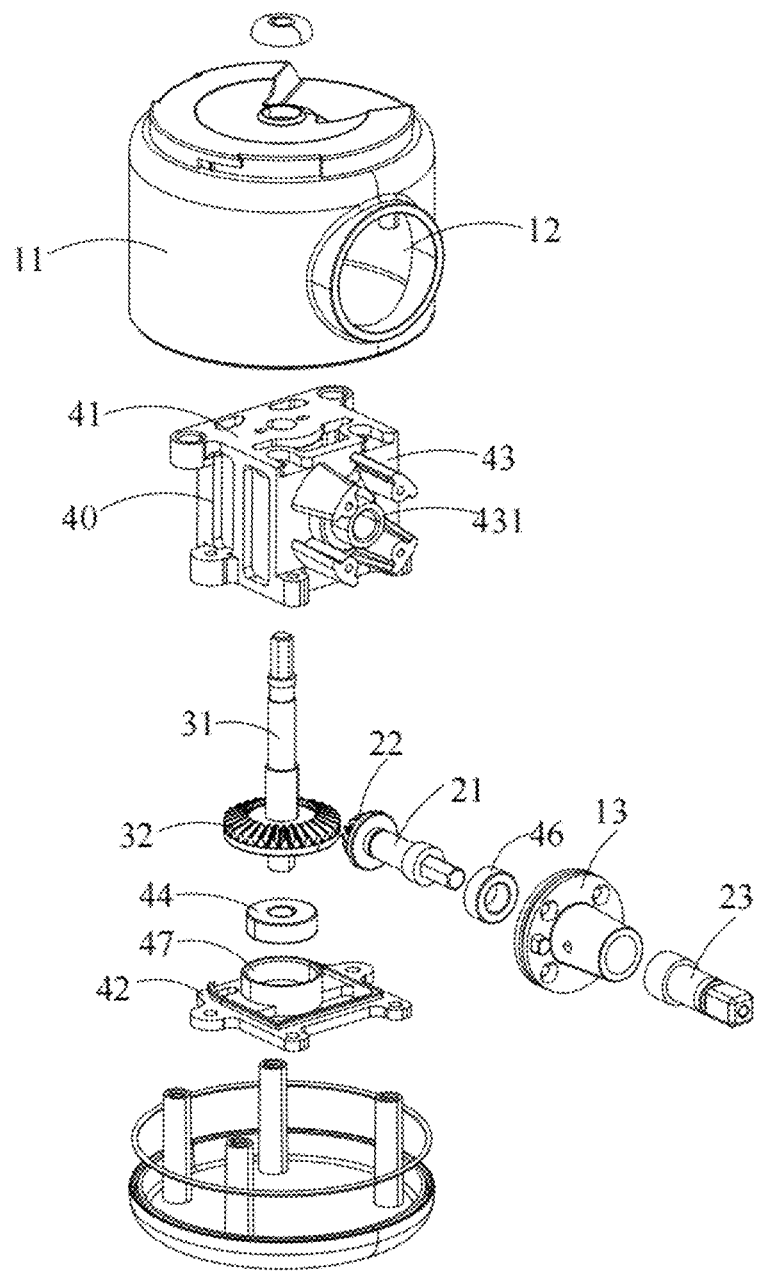
FIG. 2 is an exploded schematic diagram of a base for a kitchen appliance according to an embodiment of the present disclosure.
Figure 3:
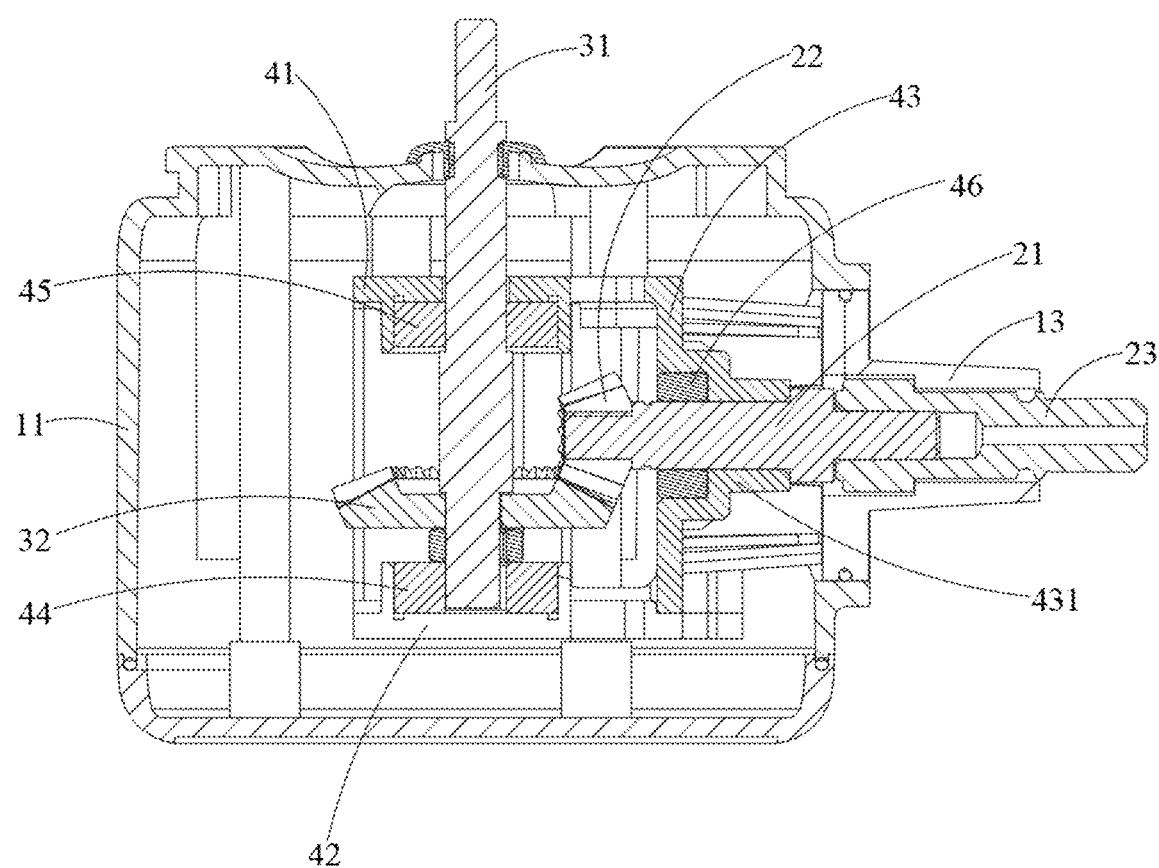
FIG. 3 is a sectional view of a base for a kitchen appliance according to an embodiment of the present disclosure.

Specifically, referring to FIGS. 2 and 3, in this embodiment, the input shaft assembly 20 includes a horizontally disposed input shaft 21 and a first gear 22 disposed at one end of the input shaft 21, and the output shaft assembly 30 includes a vertically disposed output shaft 31 and a second gear 32 disposed at one end of the output shaft 31, and the first gear 22 is meshed with the second gear 32. That is to say, the input shaft assembly 20 and the output shaft assembly 30 are arranged in the horizontal direction and the vertical direction respectively, and the transmission connection between the two is realized by meshing the first gear 22 with the second gear 32. Each of the first gear 22 and the second gear 32 may be any of cylindrical gears, bevel gears or non-circular gears.

In some embodiments, a ratio of the output rotational speed of the output shaft assembly 30 to the input rotational speed of the input shaft assembly 20 ranges from 1:1.1 to 1:10. That is to say, by means of a transmission mechanism, the high-speed rotation of the input shaft assembly 20 is converted into a low-speed rotation of output shaft assembly 30, so as to realize conversion of a small input torque into a large output torque. In this way, when the output shaft assembly 30 is connected to the appliance body, the low speed and the large torque are preferably beneficial to cutting harder ingredients, such as carrots.

In some embodiments, a ratio of the output rotational speed of the output shaft assembly 30 to the input rotational speed of the input shaft assembly 20 ranges from 5:1 to 50:1. That is to say, by means of a transmission mechanism, the low-speed rotation of the input shaft assembly 20 is converted into a high-speed rotation of the output shaft assembly 30, so as to realize conversion of a large input torque into a small output torque. In this way, when the output shaft assembly 30 is connected to the appliance body, the high speed and small torque are preferably beneficial to cutting softer ingredients, such as meat.

Referring to FIGS. 2 and 3, in this embodiment, the base 10 further includes a holder 40 disposed within the base body 11. The input shaft assembly 20 and the output shaft assembly 30 are firmly fixed to the base 10 by the holder 40. Specifically, the holder 40 has a top surface 41, a bottom surface 42, and a side surface 43 connected to the top surface 41 and the bottom surface 42. The output shaft assembly 30 is vertically arranged, and both ends thereof are rotationally connected to the holder 40. The bottom end of the output shaft assembly 30 is rotationally connected to the bottom surface 42 by a first bearing unit 44, and the top end of the output shaft assembly 30 is rotationally connected to the holder 40 and extends through the top surface 41 by the second bearing unit 45. Specifically, the top surface 41 and the bottom surface 42 of the holder 40 are provided with cylindrical accommodating spaces 47, and the first bearing unit 44 and the second bearing unit 45 are mounted in the two accommodating spaces 47 respectively, the bottom end of the output shaft 31 is rotationally connected to the first bearing unit 44, and the top end of the output shaft 31 is rotationally connected to the second bearing unit 45. In this embodiment, the top end of the output shaft 31 extends out of a top of the base body 11, which is convenient for connecting with the appliance body. Certainly, the top end of the output shaft 31 may not extend out of the base body 11.

The input shaft assembly 20 is horizontally arranged, and the input shaft assembly 20 is rotationally connected to the holder 40 by a third bearing unit 46 and extends through the side surface 43 of the holder 40, and extends out of a side surface 43 of the base 10. A horizontally extending fixing seat 431 is provided outside the side surface 43 of the holder 40, an opening 12 is provided on the side surface 43 of the base and allows the fixing seat 431 to pass through. A locking sleeve 13 is connected to the fixing seat 431 and arranged outside the opening 12, and an end of the input shaft assembly 20 connected to the external actuator extends through the fixing seat 431 and the locking sleeve 13 in sequence and extends out of the locking sleeve 13.

Specifically, the fixing seat 431 is also provided with a accommodating space 47, the third bearing unit 46 is provided in the accommodating space 47. An end, inside the holder 40, of the input shaft 21 of the input shaft assembly 20 is disposed within the holder 40 for mounting a first gear 22; and the other end, outside the holder 40, of the input shaft 21 extends through the third bearing unit 46, the fixing seat 431, and the locking sleeve 13, and protrudes out of the locking sleeve 13 for connecting with the external actuator. The fixing seat supports the end, extended portion extending outside the holder 40, of the input shaft 21, and the locking sleeve 13 serves as a limiting device.

In this embodiment, the input shaft assembly 20 further includes an adapter shaft 23, one end of the adapter shaft 23 extends into the locking sleeve 13 for coaxial connection with the input shaft 21, and the other end of the adapter shaft 23 extends out of the locking sleeve 13 for connection with the external actuator. As an alternative, it is possible to lengthen the input shaft 21 to omit the adapter shaft 23.

Figure 4:
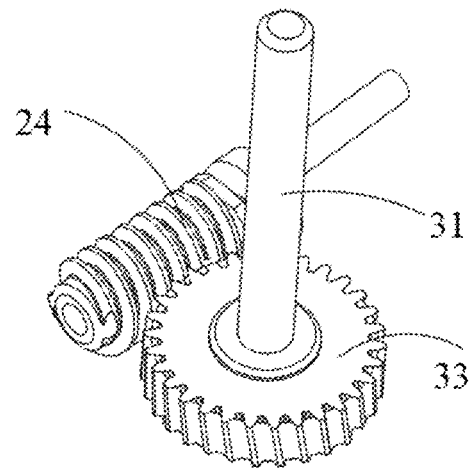
FIG. 4 shows a transmission of an input shaft assembly and an output shaft assembly according to another embodiment of the disclosure.

In some embodiments, the input shaft assembly 20 and the output shaft assembly 30 are provided in other configurations. With reference to FIG. 4, the input shaft assembly 20 includes a horizontally disposed worm 24, and the output shaft assembly 30 includes a vertically disposed output shaft 31 and a worm wheel 33 disposed on the output shaft 31, the worm 24 is meshed with the worm wheel 33.

Figure 5:
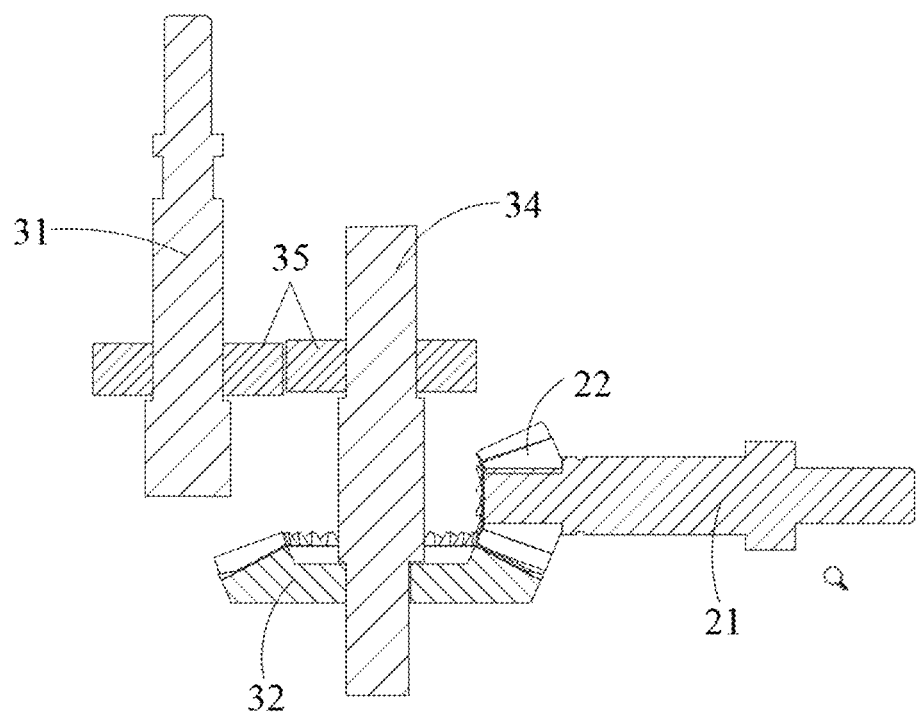
FIG. 5 is a sectional view showing transmission of an input shaft assembly and an output shaft assembly according to another embodiment of the disclosure.

In another embodiment, referring to FIG. 5, the input shaft assembly 20 includes a horizontally disposed input shaft 21 and a first gear 22 disposed at one end of the input shaft 21, and the output shaft assembly 30 includes an output shaft 31 vertically disposed and detachably connected to the household appliance body, an output transmission shaft 34 arranged parallel to the output shaft 31, at least one gear transmission group 35 disposed between the output shaft 31 and the output transmission shaft 34, and a second gear 32 disposed at one end of the output transmission shaft 34, the first gear 22 is meshed with the second gear 32.

Figure 6:
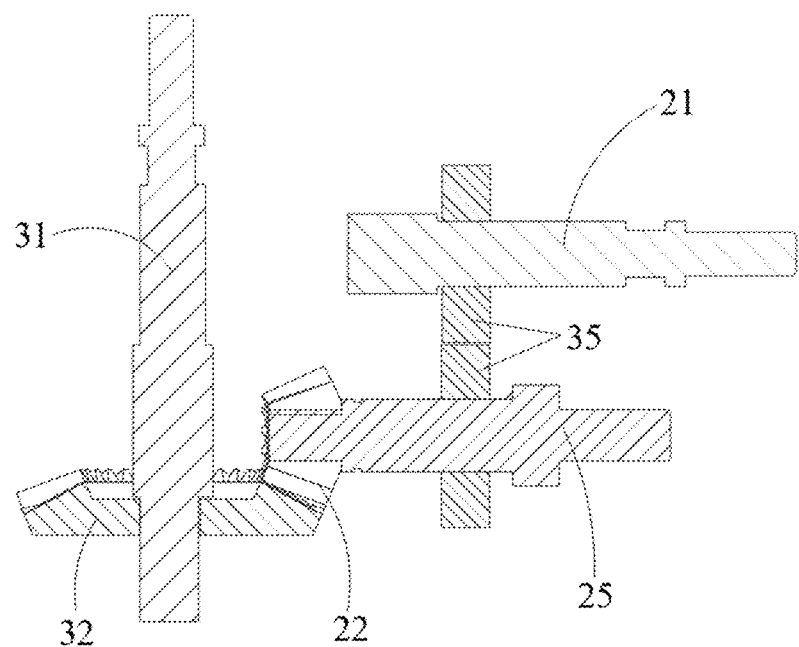
FIG. 6 is a sectional view showing transmission of an input shaft assembly and an output shaft assembly according to another embodiment of the disclosure.

In another embodiment, referring to FIG. 6, the input shaft assembly 20 includes an input shaft 21 horizontally disposed and connected to an external actuator, an input transmission shaft 25 arranged parallel to the input shaft 21, at least one gear transmission group 35 disposed between the input shaft 21 and the input transmission shaft 25, and a first gear 22 disposed at one end of the input transmission shaft 25. The output shaft assembly 30 includes a vertically disposed output shaft 31, and a second gear 32 disposed at one end of the output shaft 31, the first gear 22 is meshed with the second gear 32.

Figure 7:
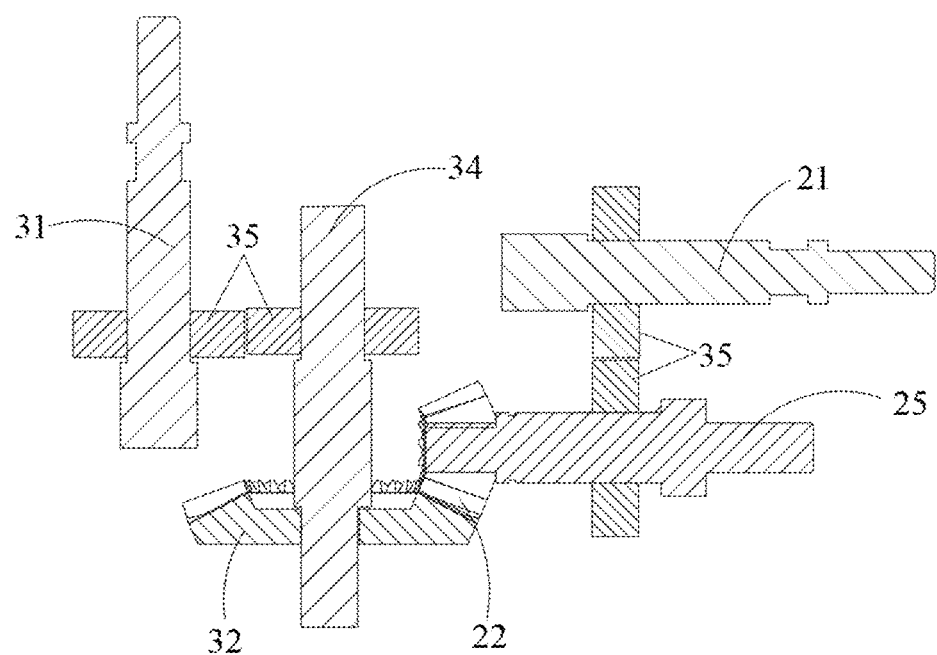
FIG. 7 is a sectional view showing transmission of an input shaft assembly and an output shaft assembly according to another embodiment of the disclosure.

In another embodiment, referring to FIG. 7, the input shaft assembly 20 includes an input shaft 21 horizontally disposed and connected to the external actuator, an input transmission shaft 25 disposed parallel to the input shaft 21, at least one gear transmission group 35 disposed between the input shaft 21 and the input transmission shaft 25, and a first gear 22 disposed at the one end of the input transmission shaft 25. The output shaft assembly 30 includes an output shaft 31 disposed vertically and detachably connected to the household appliance body, an output transmission shaft 34 arranged parallel to the output shaft 31, at least one gear transmission group 35 disposed between the output shaft 31 and the output transmission shaft 34, and a second gear 32 disposed at one end of the output transmission shaft 34, the first gear 22 is meshed with the second gear 32.

Figure 8:
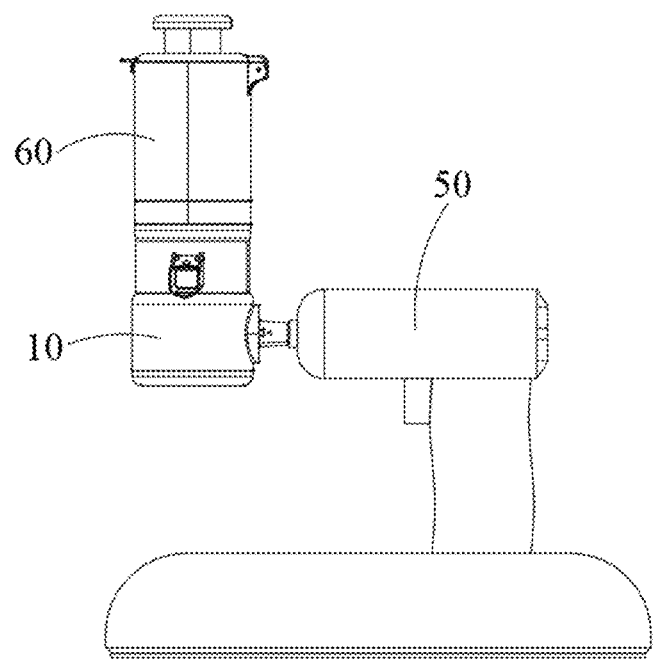
FIG. 8 is a schematic view of a kitchen appliance according to an embodiment of the disclosure.

Referring to FIG. 8, the present disclosure also provides a kitchen appliance including a base 10, an actuator 50 and at least one appliance body 60, wherein the base 10 is configured as the base 10 described above, the actuator 50 is connected to an input shaft assembly 20 arranged in the base 10, and the at least one appliance body 60 is detachably connected to an output shaft assembly 30 arranged in the base 10, the appliance body 60 is configured as a juicing cup. Certainly, the appliance body 60 may be at least one of a stirring cup, a slicing cup, or a wall-breaking cup. That is to say, a kitchen appliance has a plurality of appliance bodies 60, and each appliance body 60 is detachably connected to the base 10, so that a user can configure different appliance bodies 60 in the base 10 according to requirements, which greatly facilitates the user and also reduces the overall cost.

The embodiments described above are merely a part of the implementations of this disclosure, not all embodiments. The drawings illustrate preferred embodiments of this disclosure but do not limit the scope of the disclosure. This disclosure can be implemented in many different forms, and providing these embodiments is intended to provide a more thorough and comprehensive understanding of the disclosure. Although the disclosure has been described in detail with reference to the foregoing embodiments, those skilled in the art can still modify the technical solutions described in each of the specific embodiments or replace some technical features with equivalent ones. Any equivalent structure utilizing the contents of the specification and drawings of this disclosure, whether directly or indirectly applied in other related technical fields, shall fall within the scope of patent protection of this disclosure.

The invention claimed is:

1. A base for a kitchen appliance, comprising
a base body,
an input shaft assembly arranged in the base body and configured to connect to an external actuator,
an output shaft assembly arranged in the base body and configured to removably connect to a household appliance body,
wherein the input shaft assembly is in transmission connection with the output shaft assembly, the input shaft assembly is arranged in a first direction, and the output shaft assembly is arranged in a second direction, an included angle between the first direction and the second direction ranges from 85° to 95°,
the base further comprises a holder disposed within the base body, wherein the holder has a top surface, a bottom surface, and a side surface connected to the top surface and the bottom surface; a bottom end of the output shaft assembly is connected to the bottom surface by a first bearing unit, a top end of the output shaft assembly is rotatably connected to and extends through the top surface by a second bearing unit, and the input shaft assembly is rotatably connected, by a third bearing unit, to and extends through the side surface, and extends out of a sidewall of the base;
wherein the base is detachably connected with an external actuator and various appliance bodies, and a transmission mechanism comprised of the input shaft assembly and the output shaft assembly is independently arranged in the base.

2. The base for a kitchen appliance according to claim 1, wherein the included angle between the first direction and the second direction is 90°.

3. The base for a kitchen appliance according to claim 1, wherein the input shaft assembly comprises a horizontally disposed input shaft and a first gear disposed at one end of the input shaft, and the output shaft assembly comprises a vertically disposed output shaft and a second gear disposed at one end of the output shaft, the first gear is meshed with the second gear; or the input shaft assembly comprises a horizontally disposed worm, and the output shaft assembly comprises a vertically disposed output shaft and a worm wheel disposed on the output shaft, the worm is meshed with the worm wheel.

4. The base for a kitchen appliance according to claim 1, wherein the input shaft assembly comprises a horizontally disposed input shaft and a first gear disposed at one end of the input shaft, and the output shaft assembly comprises an output shaft vertically disposed and detachably connected to the household appliance body, an output transmission shaft arranged parallel to the output shaft, at least one gear transmission group disposed between the output shaft and the output transmission shaft, and a second gear disposed at the one end of the output transmission shaft, wherein the first gear is meshed with the second gear.

5. The base for a kitchen appliance according to claim 1, wherein the input shaft assembly comprises an input shaft horizontally disposed and connected to the external actuator, an input transmission shaft arranged parallel to the input shaft, at least one gear transmission group disposed between the input shaft and the input transmission shaft, and a first gear disposed at one end of the input transmission shaft; and the output shaft assembly comprises an output shaft disposed vertically and detachably connected to the household appliance body, an output transmission shaft arranged parallel to the output shaft, at least one gear transmission group between the output shaft and the output transmission shaft, and a second gear disposed at one end of the output transmission shaft, the first gear is meshed with the second gear.

6. The base for a kitchen appliance according to claim 1, wherein the input shaft assembly comprises an input shaft horizontally disposed and connected to the external actuator, an input transmission shaft arranged parallel to the input shaft, at least one gear transmission group disposed between the input shaft and the input transmission shaft, and a first gear disposed at one end of the input transmission shaft; and the output shaft assembly comprises an output shaft disposed vertically and a second gear disposed at one end of the output shaft, the first gear is meshed with the second gear.

7. The base for a kitchen appliance according to claim 1, wherein a ratio of the output rotational speed of the output shaft assembly to the input rotational speed of the input shaft assembly ranges from 1:1.1 to 1:10; or a ratio of the output rotational speed of the output shaft assembly to the input rotational speed of the input shaft assembly ranges from 5:1 to 50:1.

8. The base for a kitchen appliance according to claim 1, wherein a horizontally extending fixing seat is provided outside the side surface of the holder, and an opening is provided on the side surface of the base and allows the fixing seat to pass through, a locking sleeve is connected to the fixing seat and arranged outside the opening, and an end of the input shaft assembly connected to the external actuator extends through the fixing seat and the locking sleeve in sequence and extends out of the locking sleeve.

9. A kitchen appliance, comprising a base, an actuator and at least one appliance body, wherein the base is configured as the base according to claim 1, the actuator is connected to the input shaft assembly of the base, and the at least one appliance body is detachably connected to the output shaft assembly of the base, the appliance body is at least one of a juicing cup, a stirring cup, a slicing cup, or a wall-breaking cup.

\* \* \* \* \*